(12) United States Patent
Yim et al.

(10) Patent No.: US 6,417,994 B1
(45) Date of Patent: Jul. 9, 2002

(54) SWAGE PLATE WITH PROTRUDED WALLS TO INCREASE RETENTION TORQUE IN HARD DISK APPLICATIONS

(75) Inventors: Pyongwon Yim, Sunnyvale; Weonwoo Kim, Cupertino; Gregory Tran, Santa Clara; George Wakatsuki, San Jose, all of CA (US)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/296,972

(22) Filed: Apr. 22, 1999

(51) Int. Cl.[7] .............................................. G11B 21/16
(52) U.S. Cl. .................................................... 360/244.6
(58) Field of Search ........................... 360/244.6, 244.5, 360/244.4, 244.7

(56) References Cited

U.S. PATENT DOCUMENTS

| | | |
|---|---|---|
| 3,558,831 A | 1/1971 | Prescott et al. |
| 4,110,802 A | 8/1978 | Ho et al. |
| 4,280,156 A | 7/1981 | Villette |
| 4,493,554 A | 1/1985 | Pryor et al. |
| 4,555,739 A | 11/1985 | Le Van et al. |
| 4,562,500 A | 12/1985 | Bygdnes |
| 4,630,926 A | 12/1986 | Tanaka et al. |
| 4,661,873 A | 4/1987 | Schulze |
| 4,673,996 A | 6/1987 | White |
| 4,703,376 A | 10/1987 | Edwards et al. |
| 4,731,777 A | 3/1988 | Yoshitoshi et al. |
| 4,739,425 A | 4/1988 | Dierkes et al. |
| 4,784,012 A | 11/1988 | Marra |
| 4,794,588 A | 12/1988 | Yoshitoshi et al. |
| 4,802,042 A | 1/1989 | Strom |
| 4,819,105 A | 4/1989 | Edwards |
| 4,839,756 A | 6/1989 | Chew et al. |
| 4,866,553 A | 9/1989 | Kubo et al. |
| 4,870,519 A | 9/1989 | White |
| 4,890,172 A | 12/1989 | Watt et al. |
| 4,949,206 A | 8/1990 | Phillips et al. |
| 4,958,337 A | 9/1990 | Yamanaka et al. |
| 4,982,300 A | 1/1991 | Forbord |
| 5,004,207 A | 4/1991 | Ishikawa et al. |
| 5,021,905 A | 6/1991 | Sleger |
| 5,029,026 A | 7/1991 | Stefansky et al. |
| 5,062,017 A | 10/1991 | Strom et al. |
| 5,097,370 A | 3/1992 | Hsia |

(List continued on next page.)

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| FR | 2518-791 A | 6/1983 |
| GB | 2 050 670 A | 1/1981 |
| GB | 2 100052 A | 12/1982 |
| GB | 2 326 755 A | 12/1998 |
| JP | 632 344 55 | 9/1988 |
| JP | 3-83281 | 4/1991 |
| JP | 3-104079 | 5/1991 |
| JP | 09251769 A | 9/1997 |
| JP | 9-293370 | 11/1997 |
| WO | WO 93/10494 | 5/1993 |
| WO | WO 96/34390 | 10/1996 |

OTHER PUBLICATIONS

US 6,091,569, 07/2000, Allsup et al. (withdrawn)

*Primary Examiner*—Allen Cao
(74) *Attorney, Agent, or Firm*—Ireel & Manella, LLP

(57) ABSTRACT

A swage mount plate that can be used to attach a suspension arm to an actuator arm of a hard disk drive. The swage mount plate may include a sleeve that can be inserted into corresponding swage openings of the suspension arm and an actuator beam of the actuator arm. The swage plate may include at least one flange that extends from said sleeve and becomes embedded into the actuator beam. The flange may increase the retention torque of the swage plate.

10 Claims, 1 Drawing Sheet

U.S. PATENT DOCUMENTS

| | | |
|---|---|---|
| 5,128,822 A | 7/1992 | Chapin et al. |
| 5,130,870 A | 7/1992 | Jabbari |
| 5,159,508 A | 10/1992 | Grill et al. |
| 5,161,900 A | 11/1992 | Bougathou et al. |
| 5,167,167 A | 12/1992 | Tiernan, Jr. et al. |
| 5,175,661 A | 12/1992 | Mizuno et al. |
| 5,187,621 A | 2/1993 | Tacklind |
| 5,200,868 A | 4/1993 | Chapin et al. |
| 5,202,803 A | 4/1993 | Albrecht et al. |
| 5,214,549 A | 5/1993 | Baker et al. |
| 5,241,438 A | 8/1993 | Matsushima |
| 5,243,495 A | 9/1993 | Read et al. |
| 5,247,493 A | 9/1993 | Kime et al. |
| 5,262,911 A | 11/1993 | Cain et al. |
| 5,262,913 A | 11/1993 | Stram et al. |
| 5,267,109 A | 11/1993 | Chapin et al. |
| 5,274,519 A | 12/1993 | Saito et al. |
| 5,287,235 A | 2/1994 | Cunningham et al. |
| 5,293,282 A | 3/1994 | Squires et al. |
| 5,309,303 A | 5/1994 | Hsia et al. |
| 5,319,511 A | 6/1994 | Lin |
| 5,343,343 A | 8/1994 | Chapin |
| 5,347,414 A | 9/1994 | Kano |
| 5,365,389 A | 11/1994 | Jabbari et al. |
| 5,369,538 A | 11/1994 | Moe et al. |
| 5,390,060 A * | 2/1995 | Pecha et al. ............. 360/244.5 |
| 5,396,386 A | 3/1995 | Bolasana et al. |
| 5,396,387 A | 3/1995 | Murray |
| 5,402,290 A | 3/1995 | Daniel |
| 5,404,256 A | 4/1995 | White |
| 5,410,402 A | 4/1995 | Li et al. |
| 5,422,776 A | 6/1995 | Thorson et al. |
| 5,426,562 A | 6/1995 | Morehouse et al. |
| 5,442,638 A | 8/1995 | Awad et al. |
| 5,455,728 A | 10/1995 | Edwards et al. |
| 5,460,017 A | 10/1995 | Taylor |
| 5,463,527 A | 10/1995 | Hager et al. |
| 5,469,311 A | 11/1995 | Nishida et al. |
| 5,537,272 A | 7/1996 | Kazmierczak et al. |
| 5,546,250 A | 8/1996 | Diel |
| 5,555,144 A | 9/1996 | Wood et al. |
| 5,570,249 A | 10/1996 | Aoyagi et al. |
| 5,610,776 A | 3/1997 | Oh |
| 5,636,090 A | 6/1997 | Boigenzahn et al. |
| 5,663,853 A | 9/1997 | Park |
| 5,673,158 A | 9/1997 | Ichimura |
| 5,677,813 A | 10/1997 | Yoshida et al. |
| 5,703,734 A | 12/1997 | Berberich et al. |
| 5,754,353 A | 5/1998 | Behrens et al. |
| 5,768,249 A | 6/1998 | Ro et al. |
| 5,781,373 A | 7/1998 | Larson et al. |
| 5,796,555 A * | 8/1998 | Aoyagi et al. ............ 360/244.6 |
| 5,801,899 A | 9/1998 | Genheimer |
| 5,815,349 A | 9/1998 | Frater |
| 5,822,139 A | 10/1998 | Ayabe |
| 5,831,795 A | 11/1998 | Ma et al. |
| 5,844,754 A | 12/1998 | Stefansky et al. |
| 5,844,911 A | 12/1998 | Schadegg et al. |
| 5,854,721 A * | 12/1998 | Lim ......................... 360/244.6 |
| 5,860,206 A * | 1/1999 | Tochiyama ............... 360/244.6 |
| 5,870,254 A * | 2/1999 | Baserman et al. ........ 360/244.6 |
| 5,875,067 A | 2/1999 | Morris et al. |
| 5,877,919 A * | 3/1999 | Foisy et al. ............... 360/244.6 |
| 5,885,005 A | 3/1999 | Nakano et al. |
| 5,886,851 A | 3/1999 | Yamazaki et al. |
| 5,901,017 A | 5/1999 | Sano et al. |
| 5,926,347 A | 7/1999 | Kouhei et al. |
| 5,930,079 A | 7/1999 | Vera et al. |
| 5,930,080 A | 7/1999 | Frater et al. |
| 5,936,927 A | 8/1999 | Soga et al. |
| 5,956,210 A * | 9/1999 | Kaneko ................... 360/244.6 |
| 5,969,901 A | 10/1999 | Eckberg et al. |
| 5,987,733 A | 11/1999 | Goss |
| 6,011,670 A | 1/2000 | Balsley, Jr. et al. |
| 6,034,941 A | 3/2000 | Ro |
| 6,046,883 A | 4/2000 | Miller |
| 6,046,885 A * | 4/2000 | Aimonetti et al. ........ 360/244.6 |
| 6,084,744 A | 7/2000 | Genheimer et al. |
| 6,088,192 A | 7/2000 | Riener et al. |
| 6,088,194 A | 7/2000 | Imaino et al. |
| 6,088,202 A | 7/2000 | Kabasawa et al. |
| 6,154,360 A | 11/2000 | Kaczeus, Sr. et al. |
| 6,157,522 A | 12/2000 | Murphy et al. |
| 6,166,901 A | 12/2000 | Gamble et al. |
| 6,185,075 B1 | 2/2001 | Tsujino et al. |
| 6,185,807 B1 | 2/2001 | Kazmierczak et al. |
| 6,198,606 B1 | 3/2001 | Boutaghou et al. |
| 6,201,668 B1 | 3/2001 | Murphy |
| 6,205,005 B1 | 3/2001 | Heath |
| 6,226,143 B1 | 5/2001 | Stefansky |
| 6,226,152 B1 | 5/2001 | Tanaka et al. |
| 6,229,668 B1 | 5/2001 | Huynh et al. |
| 6,233,124 B1 | 5/2001 | Budde et al. |
| 6,239,943 B1 | 5/2001 | Jennings et al. |

* cited by examiner

SWAGE PLATE WITH PROTRUDED WALLS TO INCREASE RETENTION TORQUE IN HARD DISK APPLICATIONS

BACKGROUND OF THE INVENTION

1. Field of the Invention

The present invention relates to a swage mount plate that is used to attach a suspension arm to an actuator arm of a hard disk drive.

2. Background Information

Hard disk drives contain a plurality of heads that are magnetically coupled to the surfaces of magnetic disks which are rotated by a spindle motor. Each head typically includes a write element that can magnetize the disk surface and a read element that can sense the magnetic field of the disk surface. Binary information can be stored and retrieved from the disks by magnetizing and sensing the magnetic fields of the disk surfaces as is known in the art.

Each head typically has an air bearing surface which cooperates with an air flow created by the rotating disks to create an air bearing between the head and the surface of the disk. The air bearing prevents mechanical wear between the head and the disk. It is desirable to minimize the height of the air bearing to maximize the magnetic coupling between the read/write elements and the disks.

When the disk drive is powered down the disks are spun down and the heads land on the disk surfaces. When the disk drive is powered up the disks are again rotated to generate an air flow which creates the air bearings between the heads and the disk surfaces. The creation of the air bearings moves the heads away from the disk surfaces. To allow this movement the heads are typically mounted to a suspension arm which is flexible to become deflected under the force of the air bearing. A head and suspension arm are commonly referred to as a head gimbal assembly (HGA).

The suspension arm is attached to an actuator arm that is pivotally mounted to a base plate of the disk drive. The actuator arm has a voice coil which is coupled to a magnet assembly. The voice coil and magnet assembly are commonly referred to as a voice coil motor (VCM). The voice coil motor can be excited by an electrical circuit(s) to induce a pivotal movement of the actuator arm relative to the base plate. Pivoting the actuator arm moves the heads across the surfaces of the disks. Data is typically stored within annular tracks of the disks. The voice coil motor allows the heads to access the different tracks of the disks.

Each suspension arm is typically attached to a corresponding actuator beam of the actuator arm with a swage mount plate. The swage mount plate has a sleeve that extends through openings in both the suspension arm and the actuator beam. A swage ball is pushed through an inner sleeve opening to expand the sleeves into the actuator beam. The swage plate may have a lip that captures the suspension arm to attach the arm to the actuator beam. The retention force of the swage plate is proportional to the surface area of the sleeve.

It is generally desirable to assemble more disks into a disk drive while minimizing the height of the drive. These criteria may require a reduction in the thickness of the actuator beams and the height of the swage plate sleeves. A shorter sleeve may reduce the retention torque of the swage plate. It would be desirable to provide a swage mount plate which has a higher retention torque per sleeve height than plates of the prior art.

SUMMARY OF THE INVENTION

One embodiment of the present invention is a swage mount plate that can be used to attach a suspension arm to an actuator beam of a hard disk drive. The swage mount plate may include a sleeve that can be inserted into corresponding swage openings of the suspension arm and the actuator beam. The swage plate may include at least one flange that extends from said sleeve.

DETAILED DESCRIPTION

Figure 1:
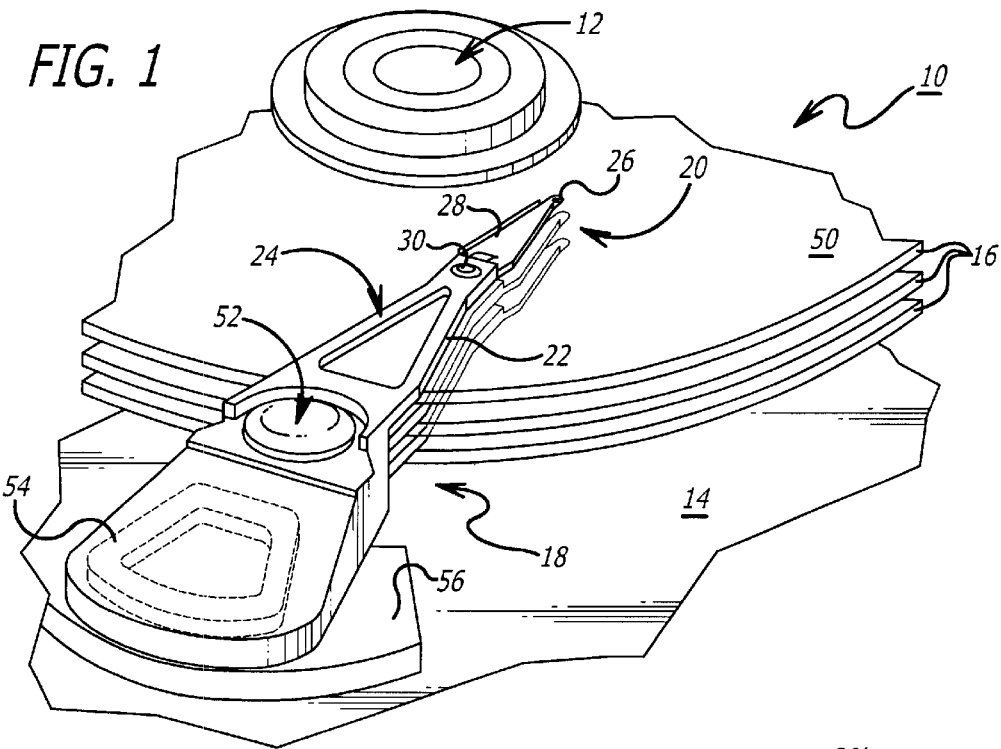
FIG. 1 is a perspective view of an embodiment of a hard disk drive of the present invention.

Referring to the drawings more particularly by reference numbers, FIG. 1 shows an embodiment of a hard disk drive 10 of the present invention. The disk drive 10 may include a spindle motor 12 that is mounted to a base plate 14. The spindle motor 12 rotates a plurality of disks 16. The disks 16 rotate relative to an actuator arm assembly 18. The actuator arm assembly 18 includes a plurality of head gimbal assemblies 20 that are attached to actuator beams 22 of an actuator arm 24. Each head gimbal assembly 20 may include a head 26 that is gimbal mounted to a suspension arm 28. Each suspension arm 28 is mounted to an actuator beam 22 by a swage mount plate 30.

Figure 2:
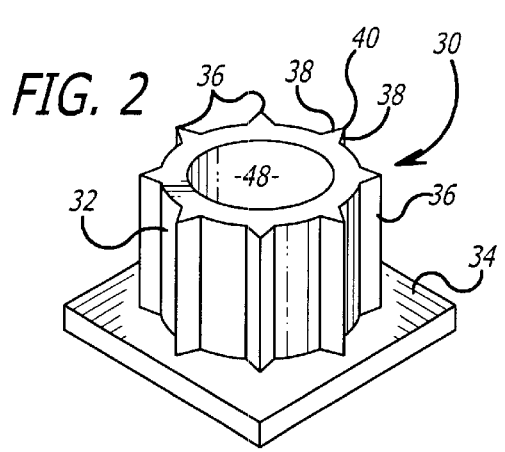
FIG. 2 is a perspective view of an embodiment of a swage mount plate.

FIG. 2 shows an embodiment of a swage mount plate 30 that can be used to attach the suspension arm 28 to the actuator arm 22. The swage plate 30 may include a sleeve 32 that extends from a lip 34. The plate 30 may further have a plurality of flanges 36 that extend along a longitudinal axis of the sleeve 32. Each flange 36 may have a pair of tapered surfaces 38 that intersect at an edge 40.

Figure 3:
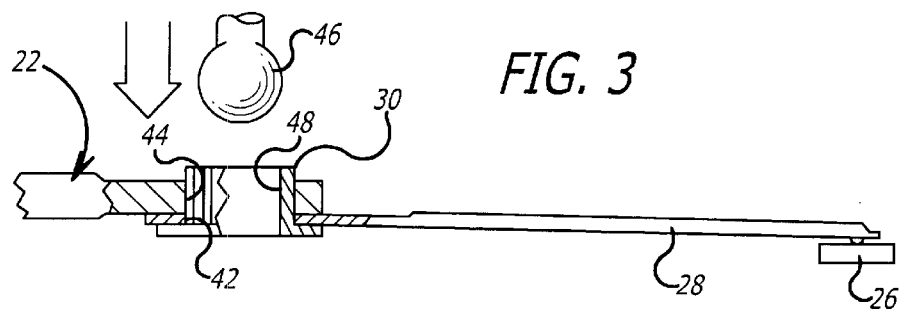
FIG. 3 is a cross-sectional view showing the swage mount plate assembled into the disk drive.

FIG. 3 shows the sleeve 32 of a swage mount plate 30 inserted into corresponding swage openings 42 and 44 in a suspension arm 28 and an actuator beam 22, respectively. A swage ball 46 can be inserted through an opening 48 in the sleeve 32 to push the flanges 36 into the beam 22. The swage plate 30 is constructed from a material that is harder than the suspension arm 28 so that the flanges 36 are pushed into the arm material. By way of example, the swage plate 30 may be constructed from steel and the arm 28 may be constructed from aluminum. The lip 34 presses the suspension arm 28 onto the actuator beam 29 to connect the components. Providing edges 40 in the flanges 36 provides a surface that can become embedded into the actuator beam 22 to increase the gripping strength of the sleeve 32 and retention torque of the swage plate 30. The openings 42, 44 and 48 can be aligned so that the swage ball 46 can swage all of the suspension arms 28 onto all of the actuator beams 22 in one motion.

Figure 4:
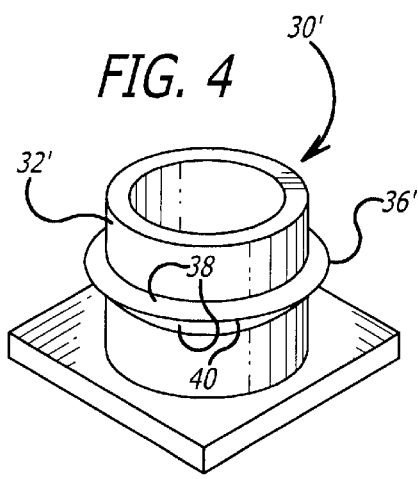
FIG. 4 is a perspective view of an alternate embodiment of the swage mount plate.

FIG. 4 shows an alternate embodiment of swage mount plate 30' which has a single annular flange 36' that extends around a circumference of a sleeve 32'. The flange 36' may have a pair of tapered surfaces 38' that intersect at an edge 40'. The flange 36' can become embedded into an actuator beam when the swage plate 30' is used to attach a suspension arm to the beam. Although one flange 36' is shown and described, it is to be understood that the swage plate 30' may have a plurality of annular flanges 36'.

Referring to FIG. 1, each head 26 is magnetically coupled to a disk surface 50. Each head 24 may include a write element (not shown) and a read element (not shown) that are coupled to an electronic circuit(s) (not shown). The circuit and read/write elements can magnetize and sense the magnetic field of each disk surface 50 to store and retrieve data within the disk drive. The data is typically stored within sectors that extend along annular tracks of the disks 16. Each head 26 typically includes an air bearing surface which cooperates with an air flow created by the rotating disks 16 to create an air bearing between the head 26 and the disk surface 50. The air bearing prevents contact and wear between the disks 16 and the heads 28.

The actuator arm assembly 18 may include a bearing assembly 52 that couples the actuator arm 22 to the base plate 14. The bearing assembly 52 allows the actuator arm 22 to pivot about the base plate 14. A voice coil 54 may be attached to the actuator arm 22. The voice coil 54 may be coupled to a magnet assembly 56 and a driver circuit (not shown). When excited by the driver circuit the voice coil 54 cooperates with the magnet assembly 42 to create a torque that swings the actuator arm 24 relative to the base plate 14. The pivotal movement of the actuator arm 22 moves the heads 28 across the disk surfaces 50 to access different tracks of the disks 16.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An actuator arm assembly for a hard disk drive, comprising:

an actuator beam which has at least one actuator beam that includes a swage opening;

a suspension arm that is attached to said actuator beam, said suspension arm has a swage opening;

a swage mount plate that attaches said suspension arm to said actuator beam, said swage mount plate having a sleeve that extends into said swage openings of said actuator beam and said suspension arm and a flange that extends from said sleeve and protrudes into said actuator beam within said swage opening.

2. The actuator arm assembly of claim 1, wherein said flange extends along a longitudinal axis of said sleeve.

3. The actuator arm assembly of claim 1, wherein said flange extends around a circumference of said sleeve.

4. The actuator arm assembly of claim 1, wherein said flange has a pair of tapered surfaces that intersect at an edge.

5. The actuator arm assembly of claim 1, further comprising a lip that extends from said sleeve.

6. A hard disk drive, comprising:

a base plate;

a spindle motor mounted to said base plate;

a disk that is rotated by said spindle motor;

an actuator arm mounted to said base plate, said actuator arm having at least one actuator beam which has a swage opening;

a suspension arm that is attached to said actuator beam, said suspension arm having a swage opening;

a head that is mounted to said suspension arm and is coupled to said disk; and, a swage mount plate that attaches said suspension arm to said actuator beam, said swage mount plate having a sleeve that extends into said swage openings of said actuator beam and said suspension arm and a flange that extends from said sleeve and protrudes into said actuator arm within said swage opening.

7. The hard disk drive of claim 6, wherein said flange extends along a longitudinal axis of said sleeve.

8. The hard disk drive of claim 6, wherein said flange extends around a circumference of said sleeve.

9. The hard disk drive of claim 6, wherein said flange has a pair of tapered surfaces that intersect at an edge.

10. The hard disk drive of claim 6, further comprising a lip that extends from said sleeve.

* * * * *